Patented Apr. 8, 1924.

1,490,018

UNITED STATES PATENT OFFICE.

MIYATAKA MIYA, OF NORFOLK, VIRGINIA.

METHOD OF PREPARING RICE.

No Drawing. Application filed November 23, 1923. Serial No. 676,627.

*To all whom it may concern:*

Be it known that I, MIYATAKA MIYA, a subject of the Emperor of Japan, residing at Norfolk, in the county of Norfolk and State of Virginia, have invented certain new and useful Improvements in Methods of Preparing Rice, of which the following is a specification.

My invention relates to methods of preparing rice.

The object of the invention is to provide a means for preparing cereals, more particularly rice, so that great economy is effected by the elimination of waste and the time of preparing the same for the table.

In cooking raw or ordinary rice, from twenty to thirty minutes is required and where a large quantity is cooked, as in restaurants and hotels, and not all used, the remainder will spoil or lose its original taste, the latter more especially, if kept in a refrigerator, and is not suitable for serving thereby entailing a waste and consequently a pecuniary loss.

In my process, I am enabled to prepare rice on "short orders" in restaurants and other places where quickness is essential, that require only from six to eight minutes to serve still detracting nothing from the nutritious value of the rice, nor any alteration in its taste.

While any quantity of rice may be treated by my process, I will take one pound of the ordinary raw rice as a basis or unit to describe the preparing of the same according to my invention, which is as follows:

One pound of rice is placed in a suitable pot, saucepan or other receptacle and thoroughly washed to free the rice from adhering flour or starch and after such the water is thrown away.

When the rice is perfectly clean I place it in the same receptacle and add one and one half pints of cold water for each pound of rice and cover the receptacle tightly. I then apply heat and gradually raise the temperature to 270 degrees, Fahrenheit, under pressure, and maintain the same for eighteen minutes.

After this treatment, the temperature is reduced to about 130 degrees, Fahrenheit, and continued for twenty-eight minutes wherein all the water will be absorbed by the rice, and after which the rice is removed from the source of heat, placed on wire cloth screen trays and "shade" dried, that is to say, without the agency of the sun's heat or light, at a temperature of about 130 degrees, Fahrenheit, for twelve hours.

The rice is usually spread thinly on the drying screen at a depth of about one quarter of an inch so that each grain may be subject to plenty of air circulation.

I use a shaded place to dry the finished rice using steam heat to effect the drying and find it superior to sun light or heat, as it adds much to the quality of the product.

Upon drying, the rice is formed into a more or less caked condition which, by suitable means, may be manipulated so that each grain may be separate and the rice is then packed into cartons or boxes for the market.

When in boxes the rice will keep in good condition indefinitely and any quantity may be used without the remainder spoiling as the treated rice is very staple under atmospheric conditions, is prepared very quickly for the table and has the same food value as raw rice.

To prepare the rice for the table, it is only necessary to place any quantity in a pot or saucepan and add just enough water to cover the rice, apply heat so that the rice may cook for about eight minutes at atmospheric pressure, at a temperature of about 212 degrees, Fahrenheit, which brings the rice into the original or expanded state, ready for serving.

If the rice is required to be very soft, it may be boiled for fifteen minutes, but ordinarily, about eight minutes is sufficient.

I may use muslin bags to contain any quantity of the treated rice while being boiled for the table so as to have it in a concreted or collected form for convenience, the rice being removed from the bags before serving.

My invention is not to be used as a mere breakfast food but for general purposes in restaurants where quick preparation of rice is required.

My invention renders the rice both convenient and economical and keeps in perfect condition in all climates besides retaining all the nutritive matter of the original rice which is not impaired by my process.

By experiment I have found that the pressure and temperature mentioned are essential for the correct preparation of my process.

I claim:—

A method of preparing hulled rice which consists in freeing the same from adhering particles, boiling the same about eighteen minutes under pressure and at a temperature of about two hundred and seventy degrees, Fahrenheit, reducing the temperature and pressure to about one hundred and thirty degrees Fahrenheit for twenty eight minutes, shade drying the resultant in layers at a temperature of approximately one hundred and thirty degrees, Fahrenheit, for twelve hours and finally subjecting the rice to an eight minutes heat treatment while confined in muslin bags at atmospheric pressure.

In testimony whereof I have hereunto affixed my signature.

MIYATAKA MIYA.